Sept. 8, 1931. H. H. RAYMOND 1,822,110
FASTENING DEVICE
Filed Aug. 21, 1929
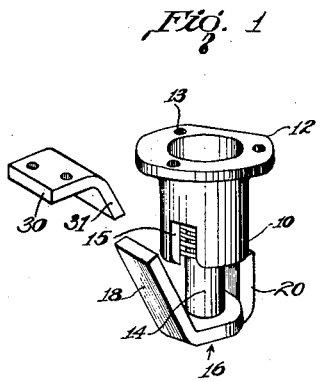
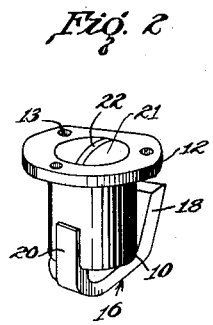
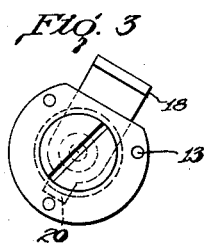
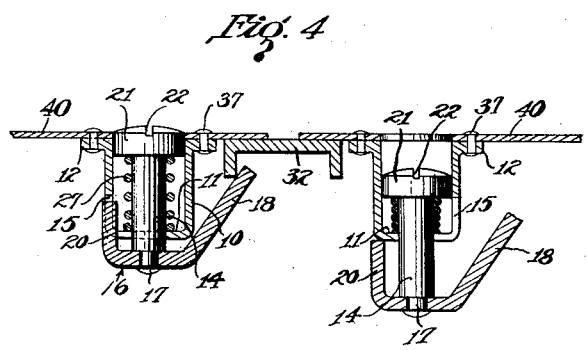
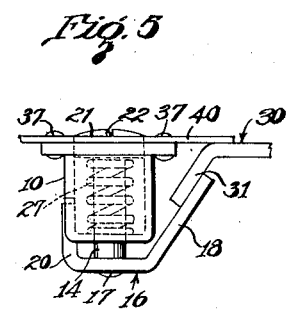
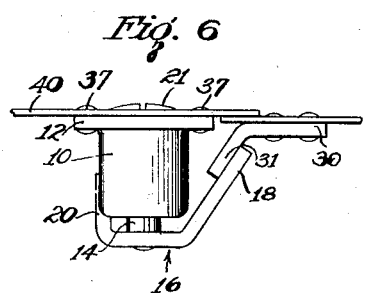
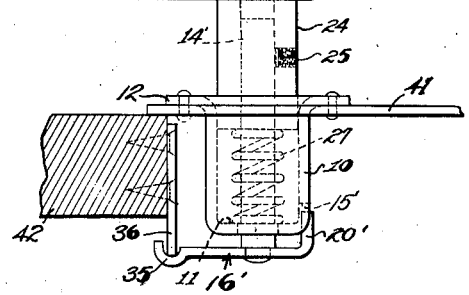
Inventor
*Horace H Raymond*
By *T. Clay Lindsey*
Attorney Patented Sept. 8, 1931

1,822,110

UNITED STATES PATENT OFFICE

HORACE H. RAYMOND, OF BERLIN, CONNECTICUT, ASSIGNOR TO THE STANLEY WORKS, OF NEW BRITAIN, CONNECTICUT, A CORPORATION OF CONNECTICUT

FASTENING DEVICE

Application filed August 21, 1929. Serial No. 387,331.

This invention relates generally to fastening devices for holding or clamping in place cowling covers for frames, panels, plates, doors and similar members where it is desirable to easily and quickly remove and position the same. As an instance of a use to which my improved fastening device may be applied, reference may be had to the securing of cowling plates to the frames of aeroplanes, as my improved device is peculiarly adapted to that use. It is to be understood, however, that devices constructed in accordance with the present invention are not limited to that specific use.

It may be here stated that most aeroplanes are provided with sheet metal coverings known as cowling. The cowling is usually located on the nose of the machine and covers up the various parts of the motor and its accessories to which access must be readily had and, therefore, the cowling must be easily removable. Fastening devices of various types have been provided for the purpose of securing the cowling in place, but these fastening devices are open to numerous objections, among which may be mentioned the expense of manufacturing and applying the fastening devices, the unreliability of such devices, the difficulty and tediousness of securing the cowling in place thereby and, in some instances, the necessity of providing holes in the framework of the machine with the result that such framework is materially weakened.

An aim of the present invention is to provide a fastening device of the character described which is entirely reliable, safe and effective, features which are of the utmost importance in connection with aeroplanes, as serious accidents may result should the cowling not be securely fastened in place or should the same work loose when in flight. The arrangement is such that there is no possibility of the fastening devices becoming unlocked or unfastened. The member of the fastener which is operated to move the fastening element into and out of securing position has but one locking position so that the pilot can readily see at a glance whether or not the fastener is locked. Where the fastener is employed for securing cowling in place, the arrangement is preferably such that curious and unauthorized persons who frequently gather about a plane cannot operate the fastener so as to see what is hidden beneath the cowling and thus the pilot is spared the trouble of going over the fasteners to see that they are all locked before he takes off. My improved fastener securely holds the cowling or other member in place against the frame and also tends to hold the cowling against movement in its own plane.

A further aim of the invention is to provide an improved fastener which may be very easily and readily applied to the member to be held in place and without the necessity of forming any large holes in the frame or other part to which the removable member is to be secured.

A still further aim of the invention is to provide an improved fastener which may be very conveniently and easily manipulated so that the cowling or panel to which it is secured may be very quickly and readily fastened in place or removed from place. There is no possiblity of any of the parts coming loose or getting in the way when the cowling or other member is being positioned in place.

When my improved fastener is used for holding cowling in place, the arrangement is preferably such that no part of the fastener extends to any appreciable amount beyond the surface of the cowling so that there will be no objectionable projections which offer a wind resistance.

Further aims of the invention are to provide improved fastening devices which are relatively simple in construction, which are light in weight, which are comparatively inexpensive in manufacture, which consist of a relatively few number of simple parts, which are strong and durable, wear being reduced to a minimum and which are effective in operation.

Other objects will be in part obvious and in part pointed out more in detail hereinafter.

The invention accordingly consists in the features of construction, combination of elements and arrangements of parts which will be exemplified in the construction hereinafter set forth and the scope of the application of which will be indicated in the appended claims.

In the accompanying drawings wherein I have shown several embodiments which the present invention may take:

Figure 1 is a perspective view of my improved fastener in unlocked position;

Fig. 2 is a view similar to Fig. 1 but showing the fastener in locked position;

Fig. 3 is a top view of the fastener with the parts shown in the position of Fig. 2;

Fig. 4 is a sectional view taken through two fasteners one of which is shown in locked position and the other in unlocked position;

Fig. 5 is a side view of a fastener in locked position and shows another type of keeper or strike plate;

Fig. 6 is an elevational view showing the manner in which a fastener may be employed for connecting two cowling pieces or panels together; and Fig. 7 is a side elevational view showing the improvements of the present invention incorporated in an aeroplane door latch.

Referring to the drawings in detail, 10 designates a shell or casing having a cylindrical barrel portion provided at its inner end with a wall 11. The outer end of the barrel is preferably open and terminates in a radially extending attaching flange 12 which may be apertured, as at 13, to receive rivets or other securing means. The end wall 11 has a round opening through which extends, and which slidably receives, a cylindrical stem 14. The casing is also provided, in its side wall, with a notch or slot 15. In the present instance, this slot extends to the opening which receives the stem 14. Secured to the inner end of the stem, and which inner end projects beyond the rear end of the casing, is a fastening element or clamp 16 which has a projection adapted to engage a strike plate, keeper or the like, and which also has a portion adapted to engage in the slot 15 when the parts are in locking position. In the present illustrative disclosures, which are shown by way of exemplification only, the clamping member 16 is secured to the reduced inner end 17 of the stem by heading that end over as shown. In the embodiments shown in Figs. 1 to 6, the fastening portion of the clamp is shown as consisting of an arm 18 inclined forwardly and outwardly with respect to the axis of the fastener. Diametrically opposite to the portion 18 is an arm or a lug 20 of lesser width than the arm 18 and adapted to be received by the notch 15 when the clamp is turned to one given position. The arm or lug 20 is preferably parallel to the axis of the stem, and the forward or free end of this arm is adapted to engage the end wall of the casing when the parts are in unlocked position. On the forward end of the stem is provided a member for manipulating the stem and the clamp, and this manipulating member is preferably so shaped as to have a sliding fit in the forward end of the barrel. In the embodiments shown in Figs. 1 to 6, the manipulating or operating member is in the form of a round head 21 having a screw driver kerf 22. The head 21 is preferably formed integrally with the stem 14. In the embodiment shown in Fig. 7, the manipulating member is in the form of a handle 23 having a cylindrical bored shank 24 adapted to receive the stem 14'. The outer end of the stem is secured in the shank by a set screw 25. For the purpose of urging the clamping member into clamping position, there is provided within the casing, and about the stem, a coiled spring 27, the rear end of which engages against the end wall 11 of the casing and the forward end of which engages against the head 21. It may be here stated that the casing is preferably made by stamping out a blank and then drawing the blank to the shape illustrated. The clamping member 16 is formed from sheet metal, and the stud having the head 21 and the stem 14 may be turned from round stock. Thus, each of the parts may be economically manufactured, and the parts may be readily assembled.

The strike plate or keeper with which the clamp member cooperates may take various forms. In Figs. 1 and 5, the strike plate is shown as in the form of an angular strip 30. The arm 31 is preferably disposed at the same angle as is the clamping arm 18. If desired, instead of using a separate strike plate, a frame member of the machine to which the cowling or panel is to be attached may be employed. For example, in Fig. 4, there is shown a channel iron 32 which forms a part of the frame of the aeroplane adjacent the motor or its accessories. The arms 18 are adapted to engage the webs of this channel iron.

In the embodiment shown in Fig. 7, and wherein is disclosed a latch for the door of the cockpit of an aeroplane, the clamping member 16' is shown as having a hook 35 which is adapted to receive the inner edge of a strike plate 36.

In Figs. 4, 5 and 6, my improved fastening device is shown as applied to cowling pieces or panels 40. In each of these figures, the casing is secured to the inner face of the cowling by rivets 37 which extend through the openings 13 in the flange 12 of the casing. In the embodiment shown in Fig. 7, the casing 10 is shown as secured to a sheet metal door 41, and the strike plate 36 is secured to the jamb 42.

The operation of my improved fastening device will be readily understood from the foregoing description taken in connection with the accompanying drawings. When it is desired to secure the cowling pieces in place, each of the fastening devices is placed in the unlocked position shown in Fig. 1 and the right hand side of Fig. 4. After the cowling has been positioned in place, the blade of a screw driver is inserted into the kerf 22 and the stud, together with the clamping member is turned until the lug is brought opposite the notch 15 whereupon the spring 27 will move the parts to the position shown in Fig. 2 and in the left hand side of Fig. 4 and, in which position, the lug 20 engages in the notch 15 and the clamping portion 18 engages the keeper or the frame as the case may be. When it is desired to remove the cowling piece, the reverse operation is carried out, the stud being pushed in to disengage the lug 20 from the notch 15 and then the stud being turned so as to bring the end of the lug into engagement with the unnotched portion of the casing. These operations may be very quickly and readily carried out so that the cowling may be secured in place and detached in a very quick and ready manner. It will be observed that the clamping member has but a single locking position and, when it is in locking position, that is, when the lug 20 engages in the notch 15, the fastener cannot possibly become accidentally unlocked. Also, it will be observed that, when the clamping member is in locking position, the head of the stud is in its outermost position and, when the clamping member is in unlocked position, the stud is inwardly of the casing so that the pilot may very readily and quickly observe at a glance whether the cowling is properly secured in place. Also, when the parts are in locked position, the outer face of the head 21 of the stud is substantially flush with the face of the cowling so that there are no projections which offer wind resistance. Since, in the embodiment shown in Figs. 4, 5 and 6, it is necessary to manipulate the device with a screw driver, those curiously inclined cannot, unaided by tools, surreptitiously unfasten the cowling. There is nothing to wear out so that the device will have a long life. It will further be observed that, due to the angularity of the portion 18 of the clamp, the tendency is to hold the cowling against the frame and also to draw or stretch the cowling in its own plane so that flapping and rattling are avoided.

The operation of the latch shown in Fig. 7 is generally similar to that described in connection with Figs. 4, 5 and 6. The handle 23 is preferably secured to the stem 14' in such angular relation to the fastening device 16' that, when the latch is in locked position, the handle is horizontally disposed. As the casing is provided with but a single notch 15', and the clamping device with a single lug 20', it necessarily follows that the handle has but one single position when the parts are in latching condition so that the pilot can readily observe whether or not the door is properly latched. When the latch is in the locking position shown, there is no possibility of the door flying open with serious results.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a fastening device of the character described, a casing having rearwardly of its forward end a surface provided with a single recess, a stem slidably and rotatably mounted in said casing, means on the forward end of said stem for manipulating the same, a clamping member fixed to said stem rearwardly of the forward end of the latter and having a portion adapted to engage in said recess when said clamping member is in predetermined angular position, said portion of said clamping member being adapted to engage said surface when said portion is not engaged in said recess, whereby said clamping member is held out of clamping condition in all but one angular position and a spring normally urging said member into clamping position.

2. In a fastening device of the character described, a casing, a stem mounted therein for rotary and axial movements, a clamping member on said stem, and a spring about said stem and normally urging said stem and clamping member forwardly, said casing having a surface against which said clamping member engages when the clamping member is in any but one predetermined angular position whereby the clamping member is held in non-clamping position, said casing having a single notch extending forwardly from said surface and adapted to receive said clamping member when the latter is in said predetermined angular position.

3. In a fastening device of the character described, a casing open at its forward end, a stem mounted in said casing for rotary and axial movements, a clamping member fixed to said stem and having a clamping portion extending laterally and forwardly, and a spring normally urging said stem forwardly and said clamping member into clamping position, said casing having a surface against which said clamping member is adapted to engage to hold the clamping member out of clamping position, said casing having a single notch extending forwardly from said surface and adapted to receive said clamping member when the latter is in clamping position.

4. In a fastening device of the character described, a casing open at its forward end and having a rear wall, a stem within said casing and projecting rearwardly beyond said rear wall, means on the forward end of said stem for manipulating the same, a clamping member fixed to the rear projecting end of said stem, a spring within said casing and normally urging said stem and clamping member forwardly, and a single notch in the side wall of said casing adapted to receive a portion of said clamping member when the latter is in clamping position, said portion being adapted to engage the rear wall of said casing when the clamping member is out of clamping position.

5. In a fastening device of the character described, a casing having an open end, a rear end wall and a single notch in its side wall and leading through said end wall, a clamping member fixed to the rear end of said stem and having a lug adapted to engage said rear wall when the clamping member is in non-clamping position, said lug being engaged in said notch when the clamping member is in clamping position, and a spring about said stem and within said casing for normally urging said stem and clamping member forwardly.

HORACE H. RAYMOND.